(12) United States Patent
D'Souza et al.

(10) Patent No.: US 6,970,714 B2
(45) Date of Patent: Nov. 29, 2005

(54) ADAPTIVE POWER LEVEL SETTING IN AN AD-HOC WIRELESS NETWORK

(75) Inventors: Raissa M. D'Souza, Stirling, NJ (US); Sharad Ramanathan, Springfield, NJ (US); Duncan Temple Lang, Stirling, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 396 days.

(21) Appl. No.: 10/136,567

(22) Filed: Apr. 30, 2002

(65) Prior Publication Data

US 2003/0203742 A1 Oct. 30, 2003

(51) Int. Cl.$^7$ ................................................ H04B 7/00
(52) U.S. Cl. ........................ 455/522; 455/69; 455/41.2; 342/465
(58) Field of Search ............................. 455/41.2, 41.3, 455/69, 522, 13.4, 14, 15; 342/465, 442

(56) References Cited

U.S. PATENT DOCUMENTS 5,267,262 A * 11/1993 Wheatley, III .............. 455/522
6,735,448 B1 * 5/2004 Krishnamurthy et al. ... 455/522

OTHER PUBLICATIONS

Ramanathan, S. et al: *A survey of routing techniques for mobile communications networks*, Mobile Networks and Applications, vol. 1, No. 2, 1996, pp. 89-104.
Broch, J. et al: *A Performance Comparison of Multi-Hop Wireless Ad Hoc Network Routing Protocols*, Proceedings of the Fourth Annual ACM/IEEE International Conference on Mobile Computing and Networking (MobiCom '98), ACM, Oct., 1998, pp. 1-13.
Gupta, P. et al: *Critical Power for Asymptotic Connectivity in Wireless Networks*, Stochastic Analysis,, Control, Optimization and Applications: A Volume in Honor of W. H. Fleming, 1988, Birkhauser.
Girod, L. et al: *Robust Range Estimation Using Acoustic and Multimodal Sensing*, Proceedings of the IEEE/RSJ International Conference on Intelligent Robots and Systems (IROS 2001), Oct., 2001.

* cited by examiner

*Primary Examiner*—Lester G. Kincaid
*Assistant Examiner*—Phuoc Doan
(74) *Attorney, Agent, or Firm*—Jeffrey M. Weinick; Donald P. Dinella

(57) ABSTRACT

Wireless devices within an ad-hoc wireless network adaptively set their transmission power levels based on locally available information. Initially, each such wireless device sets its transmission power level to a relatively low level, and gradually increases its power level up to a predetermined maximum transmission power level. As the transmission power increases, the wireless device is able to incrementally connect with additional wireless devices located at increasing distances from the wireless device. As the wireless device connects with these additional wireless devices, it checks a connectivity constraint. When the connectivity constraint is satisfied, the wireless device stops increasing its power and operates at its current power level. In one embodiment, the connectivity constraint is a geometric connectivity constraint based on the angular distribution of wireless device connections. When a wireless device detects a change in the network topology, it repeats the power setting steps in order to adapt to the changed topology.

9 Claims, 3 Drawing Sheets

ADAPTIVE POWER LEVEL SETTING IN AN AD-HOC WIRELESS NETWORK

TECHNICAL FIELD

The present invention relates generally to wireless communication. More particularly, the invention relates to dynamic power level setting in an ad-hoc wireless network.

BACKGROUND OF THE INVENTION

Most commercial public wireless networks contain a significant amount of network infrastructure which allows mobile wireless devices (e.g., wireless telephones) to communicate with each other as well as with other networks (e.g., a wired telephone network). In such networks, the infrastructure, which includes components such as base stations and other network controllers, handles network control and routing operations. The locations of the network infrastructure components are fixed, and the locations of the various components are designed to provide a desired level of network performance. Thus, each wireless device communicates directly with fixed network infrastructure components.

In areas where there is little or no communication infrastructure, wireless devices may communicate with each other by organizing into an ad-hoc wireless network. Ad-hoc wireless networks have no central control, and each wireless device which is part of the network operates as an individual communications device as well as part of the network infrastructure. Thus, each wireless device may originate messages and receive messages, but each wireless device also functions to route messages between other wireless devices which may not be in direct communication with each other.

For example, a simple ad-hoc network is shown in FIG. 1. Consider three wireless devices A, B, and C. Terminal A's communication range is shown by circle 102, terminal B's communication range is shown by circle 104, and terminal C's communication range is shown by circle 106. Thus, terminals A and B can directly communicate with each other, and terminals B and C can directly communicate with each other, but terminals A and C cannot directly communicate with each other because they are outside of each other's range. Terminals A, B, and C may organize into an ad-hoc wireless network in order to allow all three terminals to communicate with each other. This would require that terminal B act as a router to relay message between terminals A and C. Of course, in practice, ad-hoc wireless networks would likely have more than three wireless devices, and as such, routing and communication between all devices becomes an interesting problem.

Ad-hoc networks do not rely on wireless network infrastructure for communication, but instead they rely on peer-to-peer interactions for network communication. There are many applications for ad-hoc wireless networks. For example, military personnel on the field of battle; emergency disaster relief personnel coordinating efforts where there is no wireless infrastructure; sensors embedded in physical structures, such as airplane wings, exchanging data on dynamic stresses; and informal educational/professional gatherings where participants wish to communicate with each other.

One of the main issues in setting up an ad-hoc wireless network is connectivity of the wireless devices. A goal of an ad-hoc wireless network is full connectivity, meaning that there exists at least one communication path between all wireless devices. Such a path may not be a direct path and may involve multiple relays or hops among intermediate terminals. One of the constraints in reaching full connectivity is the transmission power of the wireless devices. Full connectivity would be a trivial problem if all wireless devices could transmit at a power sufficient to connect to all other wireless devices. However, power is a limited resource, and power management is required in the wireless devices. Another problem with using high power is that wireless devices operating within transmission range of each other will interfere with each other's transmissions and the higher the transmission power the more severe the interference. Thus, the goal is to use the minimum power level (so as to reduce interference and power consumption) required for full connectivity.

Existing techniques for setting power level of wireless devices in an ad-hoc wireless network have generally been based on a common power level assumption. In such networks, all wireless devices transmit at a common power level. As such, these techniques are directed to determining the minimum common power level required to obtain full connectivity. One of the problems with a common power level system is that some of the wireless devices which organize in a cluster will operate at a power level which is higher than necessary for full connectivity. Such higher power level will result in inefficient power management as well as a high level of interference between the wireless devices which are located relatively close to each other within the cluster. Another problem with the common power technique is that it assumes global knowledge of the distances between nearby wireless devices. That is, some central processing unit must know of the range requirement for connectivity of each wireless device in order to calculate the minimum common power level for all wireless devices.

SUMMARY OF THE INVENTION

The present invention provides for local adaptive power control for wireless devices operating in ad-hoc wireless networks. In accordance with the invention, a wireless device initially operates at a relatively low transmission power level. At such a level, it is unexpected that the wireless device would have connectivity to any other wireless device in the network. The wireless device gradually increases its transmission power level up to a predetermined maximum level, while incrementally connecting with additional wireless devices. Thus, as the wireless device increases its transmission power level, it would be expected that the wireless device would be able to connect with an increasing number of other wireless devices located at increasing distances away from the wireless device. The wireless device terminates its power increases, and operates at a current transmission power level, when the connection with another wireless device causes a connectivity constraint to be satisfied. If the wireless device reaches its predetermined maximum transmission power level prior to the connectivity constraint being satisfied, then the wireless device will drop its power down to the level which caused the last connection with another wireless device (if any). If the wireless device reaches its predetermined maximum transmission power level prior to connecting to any other wireless device, then it is determined that the wireless device is unconnected to any other wireless devices in the ad-hoc wireless network.

In an advantageous embodiment of the invention, the connectivity constraint is based on geometric connectivity of the wireless device. More particularly, the geometric constraint is based on the angular distribution of the additional wireless devices to which the wireless device connects as it is ramping up its transmission power level. In general, when a wireless device is connected to m neighboring wireless devices, the vectors from the central wireless device to the m neighboring wireless devices divide a unit circle around the central wireless device into m disjoint sectors. If the angle of each of these sectors is less than or equal to 180 degrees, then the geometric constraint is satisfied. If any of these angles is greater than 180 degrees, then the geometric constraint is not satisfied.

Advantageously, each wireless device which is part of the ad-hoc wireless network locally performs steps in accordance with the present invention. In this manner, an ad-hoc wireless network among all the wireless devices is constructed. Each wireless device will perform the steps upon initial entry into the ad-hoc wireless network, and periodically thereafter. How often a wireless device performs these steps depends on the mobility of the wireless devices and how often the network topology changes.

The invention provides for an improved method of adaptive power setting of wireless devices in an ad-hoc wireless network. Due to the connectivity constraint, wireless devices which are operating within dense clusters of wireless devices will adaptively set their transmission power to lower levels, therefore reducing interference within such clusters. Further, power is used more efficiently within each of the wireless devices. Ad-hoc wireless networks made up of devices which operate in accordance with the principles of the present invention have an efficient network topology. These and other advantages of the invention will be apparent to those of ordinary skill in the art by reference to the following detailed description and the accompanying drawings.

DETAILED DESCRIPTION

Figure 1:
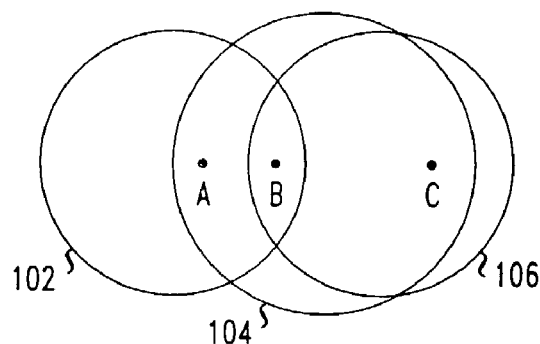
FIG. 1 illustrates a simple ad-hoc wireless network.
Figure 2:
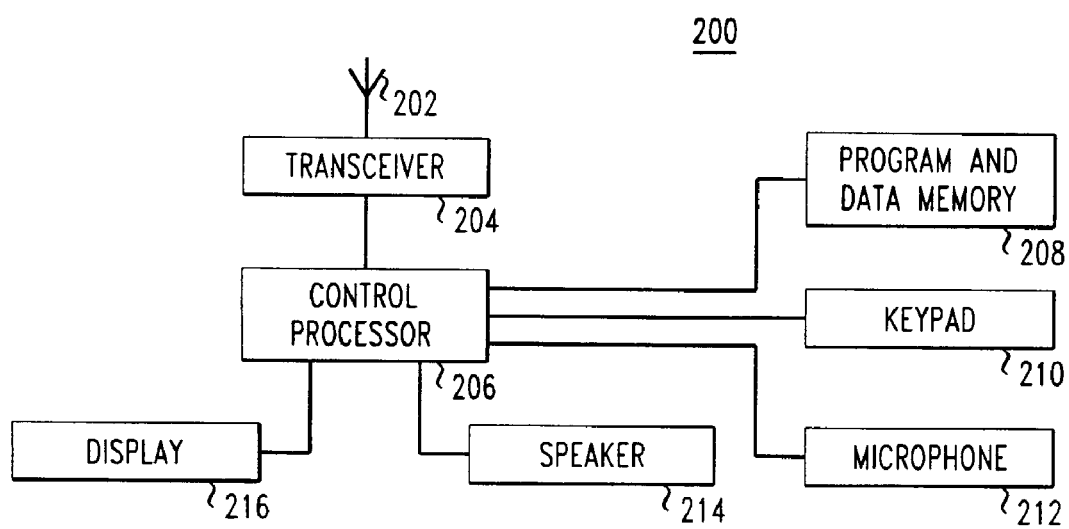
FIG. 2 shows a high level block diagram of a wireless device which may be configured in accordance with the present invention.

A high level block diagram of a wireless device 200 which may be configured in accordance with the present invention is shown in FIG. 2. Wireless device 200 includes a transceiver 204 which sends and receives signals from antenna 202. The overall functioning of the wireless device 200 is controlled by a control processor 206 which operates by executing computer program instructions which are stored in program and data memory 208. It is these program instructions which define the overall operation of the wireless device 200. Program and data memory 208 also stores other data which may be necessary for the operation of the wireless device 200. In addition, program and data memory 208 has at least a portion of which is non-volatile, such that the information contained therein remains after power to the wireless device 200 is turned off. Although FIG. 2 shows program and data memory 208 as one component, it would be recognized by one skilled in the art that program and data memory 208 may be implemented with separate memory units.

Wireless device 200 also includes a keypad 210 to allow a user to communicate with control processor 206. Sound information to be transmitted by the wireless device 200 is received via microphone 212 and sound information received by the wireless device 200 is played to the user via speaker 214. The wireless device 200 also includes a display 216 to allow the control processor 206 to display alphanumeric and graphical data to the user. It is to be understood that the block diagram is for illustrative purposes only. The design and operation of wireless devices are well known in the art and various modifications are possible. For example, the wireless device may be a mobile telephone of the type which is well known in the art. In such an embodiment, the program and data memory 208 would contain data required for operation as a mobile telephone. Further the display and keypad would be of the type appropriate for a mobile telephone. Alternatively, the wireless device may be a computing device with wireless connectivity. In such an embodiment, the program and data memory 208 would contain data required for operation as a mobile computing device and the display and keypad would be of the type appropriate for a mobile computing device. Further, in an embodiment in which the wireless device is a sensor, a keypad and speaker would not necessarily be present in the device. It is to be understood that the present invention may be implemented in any type of wireless device and is not limited to the particular embodiments shown herein. In addition, the particular type of wireless signal which is employed by the wireless device for communication is not critical. For example, and without limitation, the wireless signal may be RF, optical, microwave, audio, or any other type of wireless signal.

The steps performed by the wireless device 200 in accordance with one embodiment of the present invention will be described in conjunction with the flowchart of FIG. 3. These steps are performed under control of the control processor 206 executing computer program instructions which are stored in program and data memory 208. One skilled in the art would readily recognize that the operation of the wireless device could alternatively be controlled by hardware circuitry, or a combination of hardware and software.

Figure 3:
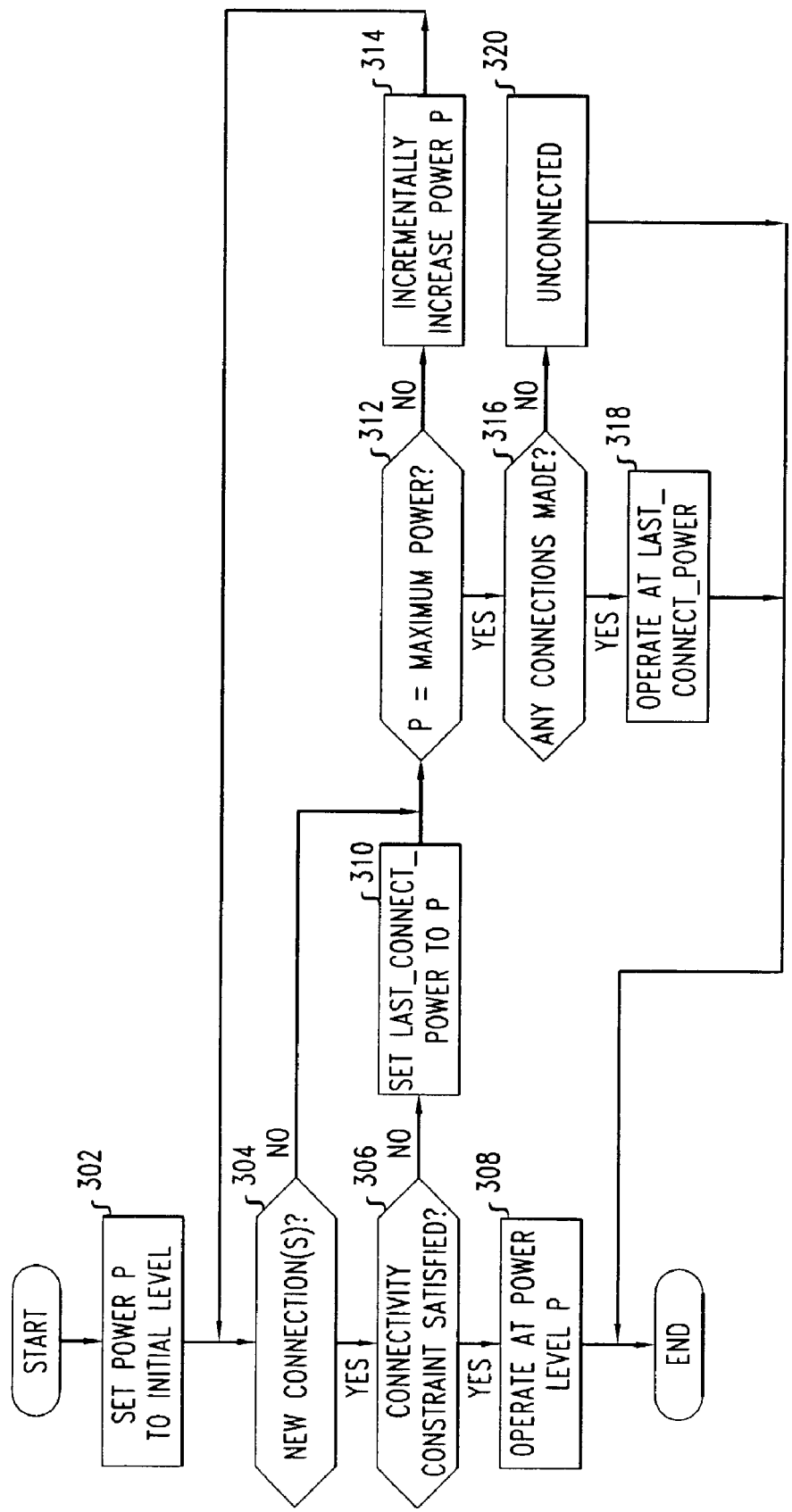
FIG. 3 is a flowchart illustrating the steps performed by a wireless device in accordance with one embodiment of the present invention.

The steps shown in FIG. 3 would be performed locally by each wireless device that is part of the ad-hoc wireless network. Thus, the wireless devices do not need global information about all other wireless devices, but only need information which is determinable by, and local to, the wireless device.

First, in step 302, the wireless device sets its power level (P) to an initial level. It is noted that the control of transmission power in a wireless device is well known in the art, the details of which will not be described in detail herein. In one embodiment, the power level is controlled by hardware in the transceiver 204 under control of the control processor 206. The initial power level would be a very low level, at which the wireless device would not expect to be connected to any other wireless device in the ad-hoc network. Next in step 304, the wireless device will determine if any new connections have been made. A new connection is a connection which is able to be made with an additional wireless device as a result of an increase in operation power. The notion of additional connections will become clearer as the description of the algorithm continues below.

It is appropriate at this point to describe how a wireless device determines connectivity with other wireless devices.

Figure 4:
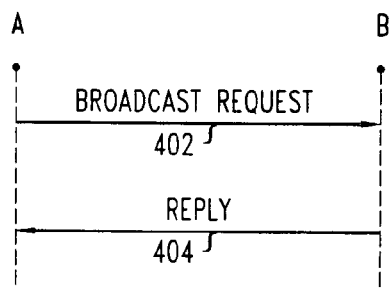
FIG. 4 illustrates a wireless handshake protocol.

There are various way in which wireless devices within an ad-hoc wireless network may determine connectivity with other wireless devices. In general, a handshake protocol is used in which one wireless device broadcasts its existence and waits for responses from other wireless devices within its range. Thus, all wireless devices will continually be in a mode in which they may receive broadcasts from other wireless devices. An example of this handshake protocol is shown in FIG. 4. Consider wireless device A which wants to determine if there are any wireless devices within its operating range. Wireless device A will send out a broadcast request 402. Assuming that wireless device B is within wireless device A's operating range, wireless device B will receive the broadcast request 402 and will respond with a reply 404. At this point, wireless device A has local knowledge of wireless device B and its connectivity to wireless device B. It is noted that handshaking protocols of the type described in conjunction with FIG. 4 are well known in the art, and that in practice the broadcast request 402 and reply 404 would contain additional information depending on the particular protocol being used. For example, the broadcast request 402 may contain an indication of the power level that wireless device A is operating at so that wireless device B may respond with an adequate power level for the reply 404 to reach wireless device A. This may be necessary because, for general communication purposes, wireless device B may be operating at a lower power than necessary to have connectivity to terminal A. Handshaking protocols of the type which may be used in accordance with the present invention are described in more detail in T. S. Rappaport, Wireless Communications: Principles and Practice, Prentice Hall, Upper Saddle River, N.J., 1996, which is incorporated herein by reference.

Returning now to FIG. 3, it is assumed that the first time through the algorithm that the result of step 304 will be that the wireless device is not connected to any other wireless devices. As such, control passes to step 312 in which the wireless device determines whether it is operating at a predetermined maximum power level. If not, then power is increased by some incremental value in step 314 and control returns to step 304. In this manner, the wireless device ramps up its power until it makes a new connection with an additional wireless device. The particular amount of incremental power increase may be chosen as a function of the density of other wireless devices operating in proximity to the wireless device, such that power is increased enough such that connection to one (but not many more than one) additional wireless device is likely. Upon making a connection with an additional wireless device, control passes to step 306 at which point it is determined whether a connectivity constraint has been satisfied.

In one embodiment of the invention, the connectivity constraint is a geometric connectivity constraint as follows. In general, when a wireless device is connected to m neighboring wireless devices, the vectors from the central wireless device (i.e., the wireless device performing the steps shown in FIG. 3) to the m neighboring wireless devices divide a unit circle around the central wireless device into m disjoint sectors. If the angle of each of these sectors is less than or equal to 180 degrees, then the geometric constraint is satisfied. If any of these angles is greater than 180 degrees, then the geometric constraint is not satisfied. This aspect of the invention will be described in further detail below in conjunction with FIG. 5.

In order to evaluate the connectivity constraint described above, the vectors from the central wireless device to the m neighboring wireless devices must be known to the central wireless device. There are various techniques for a wireless device to determine these vectors. First, directional antennas are well known in the art, and a directional antenna may be used by a wireless device to determine the direction of another wireless device with which it is communicating. Second, the use of global positioning satellite (GPS) signals may be used. As is well known, a wireless device may be equipped with a GPS receiver and processor for determining its location. A wireless device may transmit its location information to other wireless devices with which it is communicating so that direction information is known. Alternatively, other well known methods of direction detection may be used. For example, the direction techniques described in L. Girod and D. Estrin, Robust Range Estimation Using Acoustic and Multimodal Sensing, in Proceedings of the IEEE/RSJ International Conference on Intelligent Robots and Systems (IROS 2001), October, 2001, which is incorporated herein by reference, may be used to determine the direction from one wireless device to another.

Returning now to FIG. 3, if it is determined in step 306 that the connectivity constraint is satisfied, then control passes to step 308. At this point, the wireless device will operate at power level P, and the method terminates. Alternatively, if it is determined in step 306 that the connectivity constraint is not satisfied, then control passes to step 310 at which point the current power P is stored as last_connect_power. Next, in step 312, it is determined whether the current power is the maximum allowed power. If the maximum power setting has not been reached, then the power is incrementally increased in step 314 and control passes to step 304 as described above.

If it is determined in step 312 that the current power is the maximum allowed power, then it is determined in step 316 whether the wireless device has connected with any other neighboring wireless devices prior to reaching the maximum power level. If yes, then in step 318 the wireless device is set to operate at the last_connect_power level which was saved in step 310 and the method ends. If the wireless device has reached the maximum power level without connecting with any other neighboring wireless devices, then it is determined in step 320 that the wireless device has failed to connect with any other wireless devices in the ad-hoc wireless network and the method ends.

Thus, as can be seen by the above description of the operation of the wireless device, in accordance with the principles of the present invention, a wireless device starts by operating at a low power, and gradually ramps up its power while incrementally connecting with additional neighboring wireless devices. When a connectivity constraint is satisfied, the wireless device terminates increasing its power and operates at its current power level. Alternatively, if the wireless device reaches a predetermined maximum power threshold prior to the connectivity constraint being satisfied, then if the wireless device has connected to at least one other neighboring wireless device the wireless device will drop its power to the level at which it connected with the last wireless device. If the wireless device reaches the predetermined maximum power threshold prior to connecting with any other wireless devices, then the wireless device has failed to connect to the ad-hoc wireless network.

Figure 5:
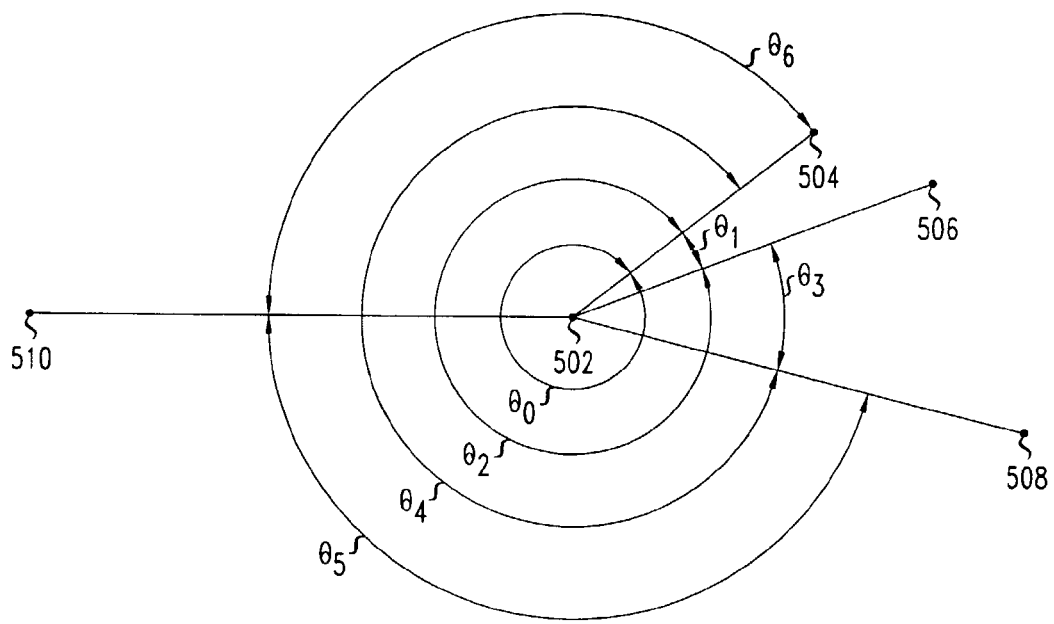
FIG. 5 shows a geometric representation of connectivity of wireless devices within an ad-hoc wireless network.

The evaluation of a connectivity constraint in accordance with one embodiment of the invention will be further described in conjunction with FIG. 5. FIG. 5 is a geometric representation of the operation of a wireless device 502 in accordance with the principles of the present invention. Initially, wireless device 502 will be operating at a low initial power level and will not be connected to any other neighboring wireless devices. Wireless device 502 will continue to increase its power until it connects with the closest neighboring wireless device 504. At this point, the connectivity constraint will be evaluated. Since there is only one additional connected wireless device, there is one vector from wireless device 502 to wireless device 504. As such, there is only one sector with an angle $\theta_0=360$ degrees, and the geometric constraint is not satisfied. The method shown in FIG. 3 continues and wireless device 502 will continue to increase its power until it connects with the next closest neighboring wireless device 506 and the connectivity constraint will again be evaluated. There are now two connected wireless devices and two vectors, one from wireless device 502 to wireless device 504 and another from wireless device 502 to wireless device 506. The unit circle is now divided into two disjoint sectors with angles shown in FIG. 5 as $\theta_1$ and $\theta_2$. While FIG. 5 is not intended to be drawn to scale, it is clear that angle $\theta_2$ is greater than 180 degrees, and as such the connectivity constraint is still not satisfied. The method shown in FIG. 3 continues and wireless device 502 will continue to increase its power until it connects with the next closest neighboring wireless device 508 and the connectivity constraint will again be evaluated. There are now three connected wireless devices and three vectors, one from wireless device 502 to wireless device 504, one from wireless device 502 to wireless device 506, and another from wireless device 502 to wireless device 508. The unit circle is now divided into three disjoint sectors with angles shown in FIG. 5 as $\theta_1$, $\theta_3$, and $\theta_4$. Since angle $\theta_4$ is greater than 180 degrees, the connectivity constraint is still not satisfied. Once again the method shown in FIG. 3 continues and wireless device 502 will continue to increase its power until it connects with the next closest neighboring wireless device 510 and the connectivity constraint will again be evaluated. There are now four connected wireless devices and four vectors, one from wireless device 502 to wireless device 504, one from wireless device 502 to wireless device 506, one from wireless device 502 to wireless device 508, and another from wireless device 502 to wireless device 510. The unit circle is now divided into four disjoint sectors with angles shown in FIG. 5 as $\theta_1$, $\theta_3$, $\theta_5$, and $\theta_6$. Since all of these angles are less than or equal to 180 degrees, the connectivity constraint is satisfied.

Thus, at this point, the wireless device will terminate the method shown in FIG. 3 and will operate at the power level which caused it to connect to neighboring wireless device 510. Alternatively, assume that after connecting to wireless device 508, but prior to connecting to wireless device 510, wireless device 502 reached its maximum power level. In such a case, as described above in conjunction with step 318 of FIG. 3, wireless device 502 would operate at the power level which caused it to connect to wireless device 508.

As described above, each of the wireless devices locally performs the steps described above in order to construct an ad-hoc wireless network among all the wireless devices. Each wireless device will perform the steps upon initial entry into the ad-hoc wireless network, and periodically thereafter. How often a wireless device performs these steps depends on the mobility of the wireless devices and how often the network topology changes. In one embodiment, each wireless device would store data indicating the wireless devices with which it is connected at a particular power level after performing the steps of FIG. 3. If the connectivity of the wireless device changes (i.e., the wireless device recognizes additional connectivity or looses connectivity) then an assumption can be made that the network topology has changed and the wireless device can initiate the steps of FIG. 3 again. Those skilled in the art would recognize that there are various other options for determining when a wireless device would initiate performance of the steps of FIG. 3.

Since, in accordance with the principles of the present invention, the ad-hoc network is constructed under local control of the wireless devices, it is possible that unidirectional links will be constructed. However, we have shown that construction of an ad-hoc wireless network locally in accordance with the principles of the invention results in a fully connected network, as long as the maximum allowed power level is high enough. This is shown mathematically as follows. The direct connections between the nodes (i.e., wireless devices) in the network specify the elements of a connectivity matrix, M. If node i is directly connected to node j, transmissions from i can be sent directly to j, and matrix element $M_{ij}=1$, otherwise $M_{ij}=0$. Note the diagonal elements $M_{ij}=1$, so nodes are connected to themselves.

We normalize the matrix M as described below to construct a new matrix, P. A normalization factor $n_j$, is determined for each column j, which is the number of non-zero entries in that column, $$n_j = \sum_i M_{ij}$$

Each element of the P matrix is $$P_{ij} = \frac{M_{ij}}{n_j}.$$

Note, this implies $$\sum_i P_{ij} = 1.$$

Due to this normalization constraint, all the eigenvalues of P must be positive and less than or equal to one. For each eigenvalue that is equal to one, there exists a connected subcluster of nodes. If only one eigenvalue is equal to one, then the one sub-cluster encompasses the entire system and the nodes are fully connected.

Above we discussed that if $M_{ij}=1$, node i can send a message to node j (i.e., node j can receive a message from i). Likewise if $M_{ij}=1$, node j can send a message to node i (i.e., node i can receive a message from j). If the connections are bi-directional, $M_{ij}=M_{ji}$. If they are uni-directional, the equality need not hold. In the latter case, we test full connectivity by checking the eigenvalues of two properly normalized matrices, $P_l$ and $P_r$. The first ensures that all nodes can send transmissions to all others. The second ensures that all nodes can receive transmissions from all others. We construct the matrix $P_l$ by mirroring the lower triangular portion of M across the diagonal, and normalizing appropriately, and construct $P_r$ by mirroring the upper triangular portion of M across the diagonal, and normalizing appropriately. Thus, as would be recognized by one skilled in the art, construction of an ad-hoc wireless network by wireless devices locally performing steps in accordance with the principles of the invention results in a fully connected network.

As described above, the present invention is directed to the construction of an ad-hoc wireless network under local control of the wireless devices. One skilled in the art would readily recognize that an appropriate routing algorithm would need to be implemented in order to allow the wireless devices to communicate messages with each other. Such routing protocols are beyond the scope of this invention and those skilled in the art would recognize that various routing protocols may be used in conjunction with the principles of the present invention in order to implement an ad-hoc wireless network. For example, feasible routing protocols are described in J. Broch, D. Maltz, D. Johnson, Y. Hu, J. Jetcheva, A Performance Comparison of Multi-Hop Wireless Ad Hoc Network Routing Protocols, in Proceedings of the Fourth Annual ACM/IEEE International Conference on Mobile Computing and Networking (MobiCom '98), ACM, Dallas, Tex., October 1998, and S. Ramanathan and Martha Steenstrup, A Survey of Routing Techniques for Mobile Communications Networks, in Mobile Networks and Applications, Vol. 1, No. 2, pages 89–104, 1996, which are incorporated by reference herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the above detailed description describes a two dimensional connectivity constraint. However, one skilled in the art would recognize that the principles of the present invention could be applied to a three dimensional connectivity constraint as well while still falling within the scope of the invention.

We claim:

1. A method for adaptive power setting of a first wireless device in an ad-hoc wireless network comprising the steps of:
   initially operating said first wireless device at a first transmission power level, said first transmission power level being selected at a level not expected to facilitate a connection between said first wireless device and additional wireless devices;
   increasing the transmission power level, up to a predetermined maximum power level, while incrementally connecting with additional wireless devices; and
   terminating said step of increasing the transmission power level, and operating said first wireless device at a current transmission power level, if connection with a particular one of said additional wireless device causes a connectivity constraint to be satisfied, wherein said connectivity constraint is a geometric connectivity constraint, said geometric connectivity constraint is based on an angular distribution between said connected additional wireless devices such that said connectivity constraint is satisfied when said angular distribution is less than or equal to one hundred eight degrees (180°).

2. The method of claim 1 further comprising the step of:
   reducing the transmission power level to operate at a transmission power level which caused connectivity to an additional wireless device if said predetermined maximum transmission power is reached prior to satisfying said connectivity constraint.

3. The method of claim 1 wherein the steps of claim 1 are repeated upon detection of a change in the topology of the ad-hoc wireless network.

4. A wireless device comprising:
   a control processor for controlling the operation of the wireless device, said control processor adapted such that the wireless device performs the steps of:
      initially operating at a first transmission power level, said first transmission power level being selected at a level not expected to facilitate a connection between said wireless device and additional wireless devices;
      increasing the transmission power level, up to a predetermined maximum power level, while incrementally connecting with additional wireless devices; and
      terminating said step of increasing the transmission power level, and operating at a current transmission power level, if connection with a particular one of said additional wireless device causes a connectivity constraint to be satisfied, wherein said connectivity constraint is a geometric connectivity constraint, said geometric connectivity constraint is based on an angular distribution between said connected additional wireless devices such that said connectivity constraint is satisfied when said angular distribution is less than or equal to one hundred eight degrees (180°).

5. The wireless device of claim 4 wherein said control processor is adapted such that the wireless device performs the further step of:
   reducing the transmission power level to operate at a transmission power level which caused connectivity to an additional wireless device if said predetermined maximum transmission power is reached prior to satisfying said connectivity constraint.

6. The wireless device of claim 4 wherein said control processor is adapted such that the wireless device repeats the steps set forth in claim 4 upon detection of a change in the topology of the ad-hoc wireless network.

7. A wireless device for operation in an ad-hoc wireless network comprising:
   means for initially operating said first wireless device at a first transmission power level, said first transmission power level being selected at a level not expected to facilitate a connection between said wireless device and additional wireless devices;
   means for increasing the transmission power level, up to a predetermined maximum power level, while incrementally connecting with additional wireless devices; and
   means for terminating said step of increasing the transmission power level, and operating said first wireless device at a current transmission power level, if connection with a particular one of said additional wireless device causes a connectivity constraint to be satisfied, wherein said connectivity constraint is a geometric connectivity constraint, said geometric connectivity constraint is based on an angular distribution between said connected additional wireless devices such that said connectivity constraint is satisfied when said angular distribution is less than or equal to one hundred eight degrees(180°).

8. The wireless device of claim 7 further comprising:

means for reducing the transmission power level to operate at a transmission power level which caused connectivity to an additional wireless device if said predetermined maximum transmission power is reached prior to satisfying said connectivity constraint.

9. The wireless device of claim 7 further comprising means for repeating the steps of claim 7 upon detection of a change in the topology of the ad-hoc wireless network.

* * * * *